US 8,595,648 B1

(12) United States Patent
Cordell et al.

(10) Patent No.: US 8,595,648 B1
(45) Date of Patent: Nov. 26, 2013

(54) SCRIPT LOGIC GRAPHICAL MAPPING

(75) Inventors: Jeffrey William Cordell, Omaha, NE (US); Anthony Mathew Stach, Omaha, NE (US); Jereomy K Frum, Omaha, NE (US)

(73) Assignee: West Corporation, Omaha, NE (US)

( * ) Notice: Subject to any disclaimer, the term of this patent is extended or adjusted under 35 U.S.C. 154(b) by 786 days.

(21) Appl. No.: 11/427,009

(22) Filed: Jun. 28, 2006

(51) Int. Cl.
*G06F 3/048* (2013.01)

(52) U.S. Cl.
USPC ........... 715/818; 715/712; 715/713; 715/855; 715/853; 715/854; 717/106; 717/107; 717/109; 717/120; 717/122; 717/123; 717/124; 717/125; 717/126; 717/127

(58) Field of Classification Search
USPC .............. 705/8; 715/712, 713, 818, 853, 854, 715/855; 717/106, 107, 109, 120, 122, 123, 717/124, 125, 126, 127, 132
See application file for complete search history.

(56) References Cited

U.S. PATENT DOCUMENTS

| | | | | |
|---|---|---|---|---|
| 5,850,221 A * | 12/1998 | Macrae et al. | ................. | 715/853 |
| 7,136,865 B1 * | 11/2006 | Ra et al. | ................... | 1/1 |
| 7,456,840 B2 * | 11/2008 | Molesky et al. | .............. | 345/581 |
| 7,584,283 B2 * | 9/2009 | Ra et al. | ......... | 709/227 |
| 7,765,165 B2 * | 7/2010 | Malden et al. | ................. | 705/304 |
| 2002/0022986 A1 * | 2/2002 | Coker et al. | .................... | 705/10 |
| 2002/0140731 A1 * | 10/2002 | Subramaniam et al. | ...... | 345/762 |
| 2003/0041314 A1 * | 2/2003 | Heeren et al. | ................. | 717/109 |
| 2003/0161463 A1 * | 8/2003 | Galvin | ..................... | 379/265.01 |
| 2003/0163360 A1 * | 8/2003 | Galvin | .............. | 705/8 |
| 2006/0284855 A1 * | 12/2006 | Shintome | ..................... | 345/173 |
| 2007/0198180 A1 * | 8/2007 | Sakamoto | ..................... | 701/211 |

\* cited by examiner

*Primary Examiner* — Steven Sax
*Assistant Examiner* — David Choi

(57) ABSTRACT

A system, method, and computer readable medium for script logic graphical mapping comprises displaying a panel associated with at least one script, presenting a branching logic associated with the panel and creating a graphical map of the panel and the branching logic where the graphical map allows zooming in to show panel logic associated with the panel, and the graphical map allows zooming out to show the branching logic associated with the panel.

17 Claims, 9 Drawing Sheets

SCRIPT LOGIC GRAPHICAL MAPPING

CROSS REFERENCE TO RELATED APPLICATIONS

The present patent application is related to commonly assigned Ser. No. 11/427,013 entitled REMOTELY MONITORING CALL CENTER STATISTICS, and Ser. No. 11/427,010 entitled SESSION INITIATION PROTOCOL ENABLED AGENT DESKTOP ENVIRONMENT, and Ser. No. 11/427,008 entitled SCRIPT LOGIC VIEWING, and Ser. No. 11/427,014 entitled REAL TIME FEEDBACK OF SCRIPT LOGIC, and Ser. No. 11/427,014 entitled CONTACT CENTER CALL ROUTING BY AGENT ATTRIBUTE filed on even date herewith, the entire contents of which are incorporated by reference herein.

BACKGROUND OF THE INVENTION

The present invention is generally related to script logic, and more specifically, to script logic graphical mapping.

To increase call center customer satisfaction, agents must have accurate timely information and must respond quickly. This timely and accurate response by the agent is enabled by continuous flow of information to and from the agent in the form of a script. The script allows the agent to handle objections, answer questions and gather information in an efficient process. The script as a whole is comprised of individual panels which have instructions, information and data queries. This set of panel instructions, information and data queries are referred to as panel logic. The panels themselves are tied together depending upon the questions asked and information required, this panel to panel linkage is referred to as branching logic and can tie a large variety of panels together in a dynamic fashion as the need arises. Panels tied together by branching logic form a script path. The design of panel logic and branching logic can be extremely complex due and requires much time and effort to debug.

Therefore, what is needed is an ability to efficiently present the script logic. More specifically, what is needed is a graphical mapping of the script logic to provide more efficient debugging of the panels and branching logic. The present invention advantageously allows graphical mapping of the script logic associated with a script.

SUMMARY OF THE INVENTION

To increase call center customer satisfaction, agents must have accurate timely information and must respond quickly. This timely and accurate response by the agent is enabled by continuous flow of information to and from the agent in the form of a script. The script allows the agent to handle objections, answer questions and gather information in an efficient process. The script as a whole is comprised of individual panels which have instructions, information and data queries. This set of panel instructions, information and data queries are referred to as panel logic. The panels themselves are tied together depending upon the questions asked and information required, this panel to panel linkage is referred to as branching logic and can tie a large variety of panels together in a dynamic fashion as the need arises. Panels tied together by branching logic form a script path. The design of panel logic and branching logic can be extremely complex due and requires much time and effort to debug. Graphical mapping of the script logic to provides more efficient debugging of the panels and branching logic. The invention allows graphical mapping of the script logic associated with a script. The present invention reviews script logic and models panels as boxes. A graphical map view of the script logic is created and a web-based view to additional detail of the graphical map is provided. Branching logic is represented, for example, by a series of arrows.

The present invention applies drill down and navigation capabilities of global mapping to scripting. A "nation-wide" view of scripts provides a holistic view of the script logic. A developer may elect to focus in on a particular script path (akin to a city view on a map). This view provides a less cluttered view that allows the developer to specifically follow arrows and branching code. The street view provides the actual panel script logic and also allows the developer to see the agent's actual web page view.

If run independently, users of the script logic viewing tool of the present invention are routed to a Main page. A web server is searched to identify all currently installed script logic viewing scripts to populate the script name and version selection list-boxes. Once a script and version have been selected and confirmed, users are routed to the display page. If the tool is used inside of the script logic viewing environment, the user is routed directly to the display page and the selected script is passed in a query string.

Script logic viewing creates a XML navigation file that represents each script's defined paths, entry points into a script, and their related first panels, HTML and related code behind files that are displayed to the user. When loading the display page, this navigation file is read to establish the different script paths assigned to the selected script and their related first panel. The present invention then reads the code related to the files for each first panel and maps out all possible routing from a target panel. Each target is then processed until a route is duplicated or no further paths are found.

The display area is calculated to fit the number and length of paths found. All the routes are sorted by length and are rendered in a longest-to-shortest routine from the center of the calculated display area. An optimal box position is first calculated and drawn for paths and their key descriptive information is displayed at its center. Box size is dynamically determined by the script specific names and values found with an overall max value as a cap. The paths are then rendered based on the routing information collected earlier and the box display locations. In the case of zooming, the graph positions are recalculated based on a scale provided by the user. Drawing initially takes place on an in memory bit map which is then output to another or secondary page, such as a visual basic .net page. The display page display area is an image button which points to this secondary page or web page. The drawing positions of the most recent display are kept in memory for a quick reference redraw of a last displayed view.

All panels that are associated with the script but are not reachable through any of the current paths are listed in a missing panels list-box. This is a key item as often times these panels are left out of the script design unintentionally. For large scripts, this allows a developer to quickly glance at the panels not currently being used and identify if a mistake may have been made.

A list of all paths and panels that are part of the script's current routing are also displayed for filtering purposes. If the script path value is changed, the listed panels are filtered to only display panels that are part of the specified path. This is a quick reference for the developer to determine which panels are currently being used in a specific path. Each filtered view can be selected for display allowing the user to quickly visually track progress down specific script paths at any level to ensure the proper script flow is taking place. The script routing and logic can be visually understood and checked by individuals, for example non-technical individuals, with no training in the scripting tool itself. The present invention allows non-development management and end-client review of scripts. From a development stand point, the ability to review the script visually from an optional scale is key in logic tracking, testing and trouble shooting of scripts.

The display can either show all routes out of a path/panel or into a script path or panel. In the case of a display of all routes into a path or panel, routing lists are searched for the target path or panel. All routes where the target is found are shortened so the target is the end point and the graph is rendered. This view allows an agent to quickly display all routes in a script into a specific panel which is often important for testing and trouble shooting and can be a very difficult and time consuming task if performed manually.

When the displayed image is accessed, for example by "clicking" the image, the position is determined. If a box was found to be clicked on the left side, a quick redraw from that path or panel takes place. This feature is provided in order to save time and make the interface more user friendly. If the box is clicked on the right side, the panel is "drilled into" and the user is routed to a drill down page. The panel's HTML page is displayed in the right frame for visual confirmation. The panel's code related to the file is then read and split into the primary function sections representing the life cycle of a panel, such as load, edit, submit, and branch. This information is made available on the left frame. Any possible navigations points out of the current panel are also listed as links allowing for script navigation from the drill down page. If the navigation takes place, the drill down page is reloaded for the new panel. The drill down page allows script developers to quickly view a panel and its code from the visual display and when a closer look is needed, one click will display the page itself and its related code. This allows developers to quickly check for code or display errors. The script can then be navigated from this view to allow for a visual "walk through" of the different script routes. The present invention allows technical or non-technically trained personal to quickly and easily see the displayed screens without any script logic specific training.

The present invention currently includes the following features:

Sort and list all scripts on a web server (Main Page);
List all paths associated with a target script (Display Page);
List all panels associated with a script (Display Page);
List all panels in a specified script path (Display Page);
List "Missing Panels", all panels in a script folder that are not currently reachable in the script (Display Page);
Graphically display a script to visually track panel branching options (Display Page);
Filtered graphing, and an ability to limit a graph to a specific type of path, paths and panels (Display Page);
One click redraw option, an ability to redraw a graph from a specified path/panel by clicking on the left side of the box (Display Page);
Reverse/Inverse graphing, an ability to show all paths/routes into a specific path/panel versus all paths out (Display Page);
Drill down capability, in the display panel and its related code (Drill Down Page);
Drill down navigation, on a drill down page list of next panels provided as links (Drill Down Page);
Navigate through a script from a drill down view (Drill Down Page);
Save snap-shots of a graph to a file (Display Page);
Resize the graphical display (Display Page); and
Last View button provided for quick restoration of historical displays (Display Page).

In one embodiment of the present invention, a method for script logic graphical mapping comprises displaying a panel associated with at least one script, presenting a branching logic associated with the panel and creating a graphical map of the panel and branching logic connected to the panel, wherein the graphical map allows zooming in to show panel logic associated with the panel, and the graphical map allows zooming out to show the branching logic associated with the panel. The method may also comprise sorting the at least one script, listing the at least one script, tabulating panels in a specified script path, filtering the graphical map to display a specified script path, distilling the graphical map to display a specified script path type, refining the graphical map to display a specified panel, reversing the graphical map to display panels that enter the panel, providing a list of subsequent panels, establishing a navigation file showing script paths associated to the at least one script and a first panel and recording the script path associated with the panel. The panels may be displayed as boxes in the graphical map, and the branching logic associated with the panel may be displayed as an arrow.

In a further embodiment of the present invention, a computer readable medium comprises instructions for displaying a panel associated with at least one script, presenting a branching logic associated with the panel, and inventorying panels associated with the script that are not connected by branching logic. The computer readable medium may further comprise instructions for creating a graphical map of the panel and branching logic connected to the panel, wherein the graphical map allows zooming in to show panel logic associated with the panel, and the graphical map allows zooming out to show the branching logic associated with the panel, reversing the graphical map to display panels that enter the panel, sorting the at least one script, listing the at least one script, filtering the graphical map to display a specified script path, distilling the graphical map to display a specified script path type, and refining the graphical map to display a specified panel.

In another embodiment of the present invention, a system for script logic graphical mapping comprises a processor, wherein the processor displays a panel associated with at least one script, presents a branching logic associated with the panel and creates a graphical map of the panel and branching logic connected to the panel, and a memory communicably coupled to the processor, wherein the memory stores the graphical map. Wherein the system processor may inventory panels associated with the at least one script that are not connected by branching logic, filter the graphical map to display a specified script path, distill the graphical map to display a specified script path type, and refine the graphical map to display a specified panel.

DETAILED DESCRIPTION OF THE INVENTION

Figure 1:
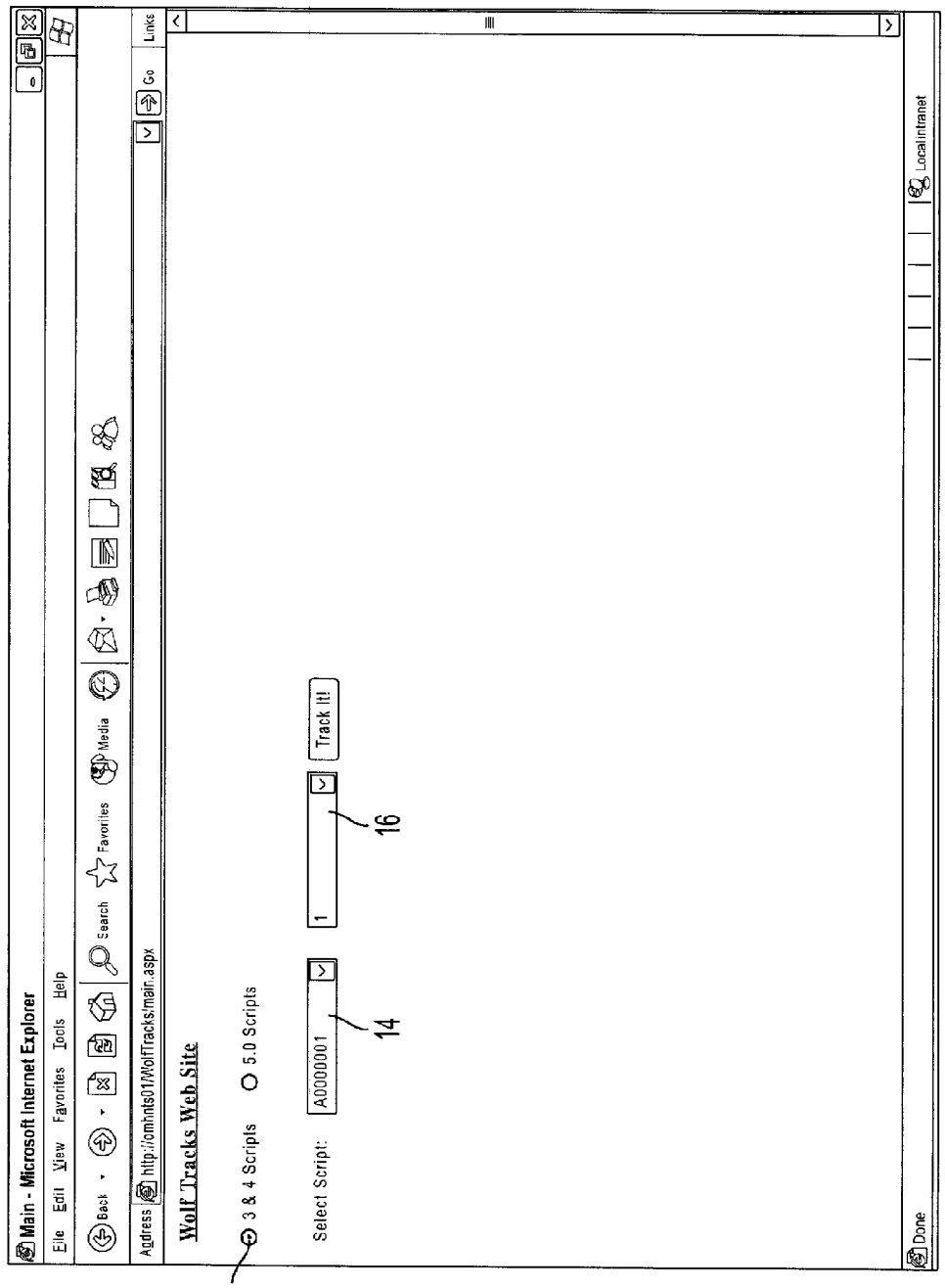
FIG. 1 depicts a main screen of the script logic graphical mapping in accordance with a preferred embodiment of the present invention.

Referring now to FIG. 1, a main screen 10 providing the script logic graphical mapping of the present invention is depicted and comprises a number of blocks or modules that may be software, hardware, firmware, and/or the combination of software, hardware, and/or firmware. The main screen allows a version of a script 12, a script logic name 14 and a panel within the script 16 to be selected by the user.

Figure 2:
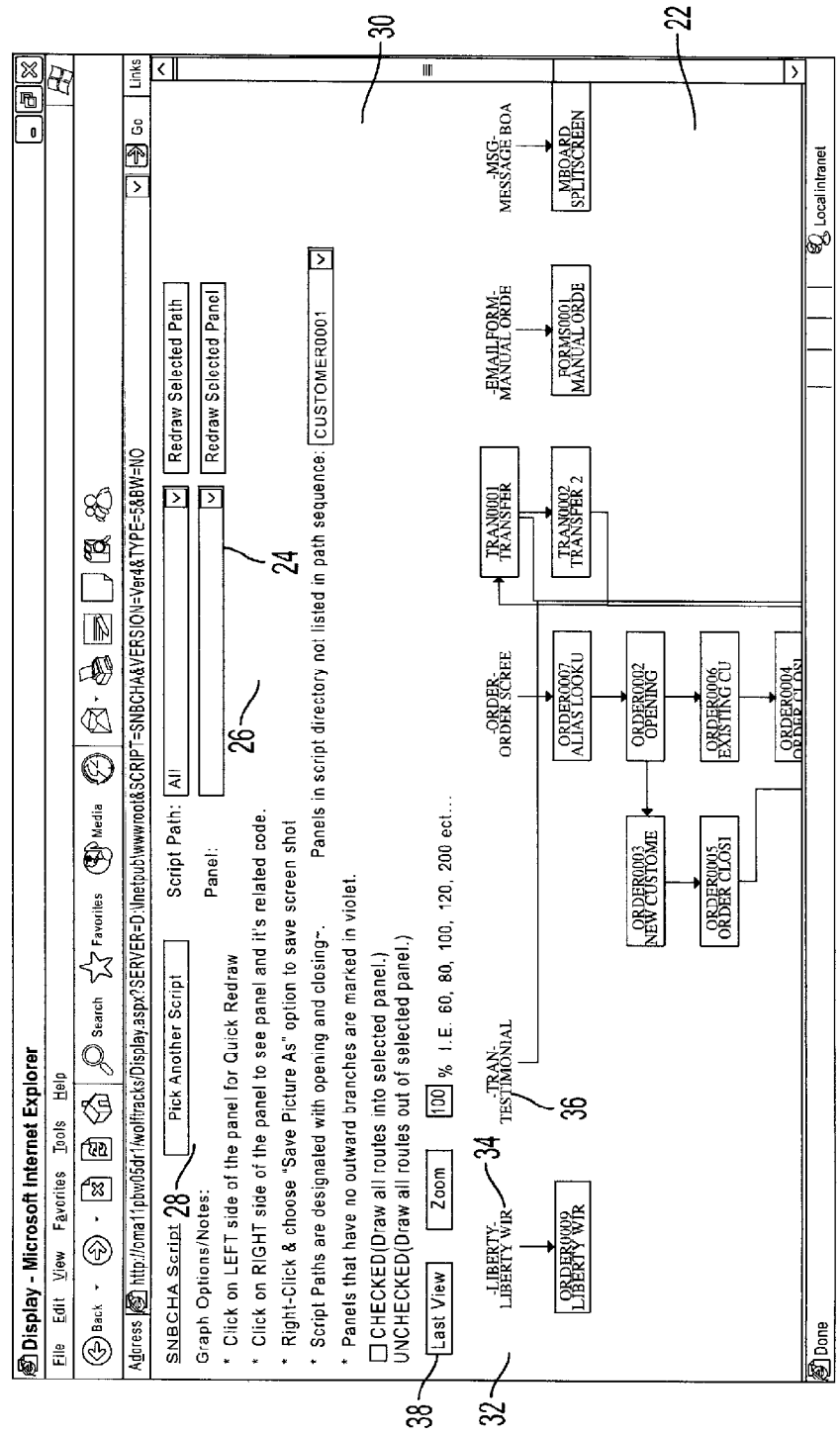
FIG. 2 depicts a display screen of the script logic graphical mapping in accordance with a preferred embodiment of the present invention.

Referring now to FIG. 2, a display screen 20 providing the script logic graphical mapping of the present invention is depicted and comprises a number of blocks or modules that may be software, hardware, firmware, and/or the combination of software, hardware, and/or firmware. The display screen 20 shows a graphical representation of the script logic 22. The user selectable criteria include a selected logic script path 24, a specified panel within the script path 26 and the ability to restart and choose another script logic 28. The display also indicates panels that are in the script directory but not within the listed path sequence 30, a last view function 32 and zoom 34. The present invention includes a reverse view function 38 that allows all routes into or out of a selected panel to be displayed.

Figure 3:
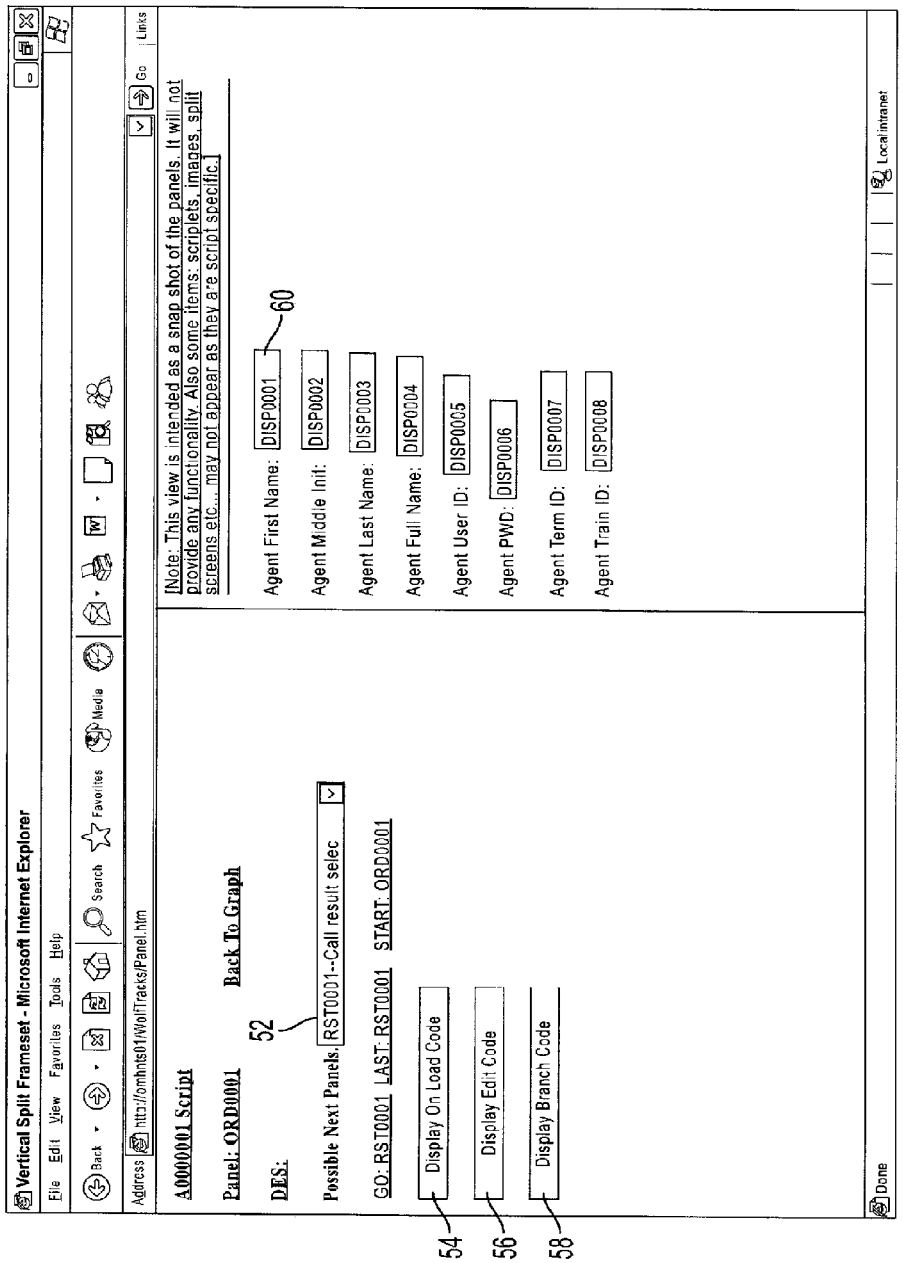
FIG. 3 depicts a drill down screen of the script logic graphical mapping in accordance with a preferred embodiment of the present invention.

Referring now to FIG. 3, a drill down screen 50 providing the script logic graphical mapping of the present invention is depicted and comprises a number of blocks or modules that may be software, hardware, firmware, and/or the combination of software, hardware, and/or firmware. The drill down screen allows a display of upcoming panels 52 and of load instructions 54. The display allows review of panel logic code 56 and branching logic code 58 and additionally allows simulating an agent interaction 60.

Figure 4:
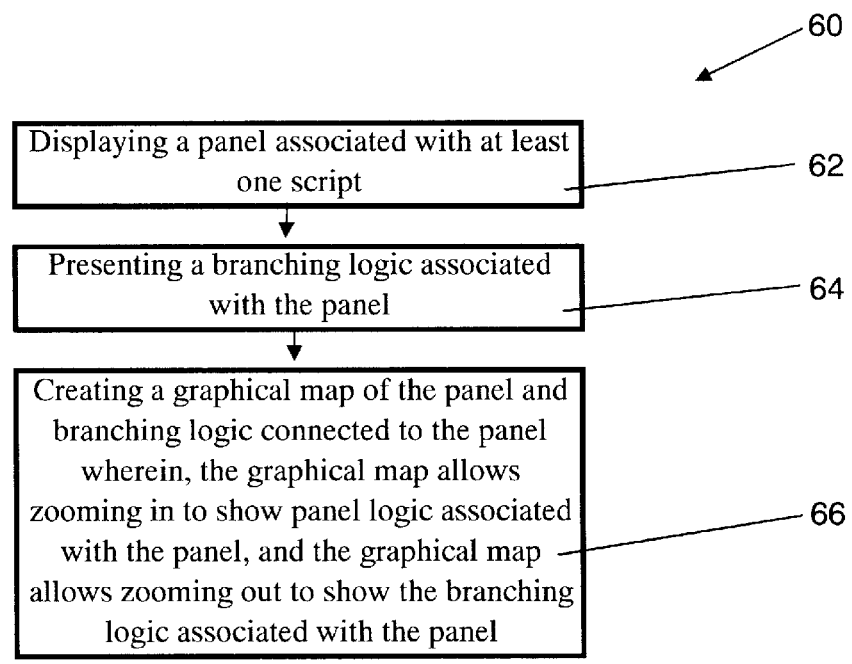
FIG. 4 depicts a first method of script logic graphical mapping in accordance with a preferred embodiment of the present invention.

Referring now to FIG. 4, a first method of script logic graphical mapping 60 is depicted and comprises displaying 62 a panel associated with at least one script, presenting 64 a branching logic associated with the panel and creating 66 a graphical map of the panel and branching logic connected to the panel, wherein the graphical map allows zooming in to show panel logic associated with the panel, and the graphical map allows zooming out to show the branching logic associated with the panel. The method is performed by software, hardware, or firmware, and/or the combination of software, hardware, and/or firmware.

Figure 5:
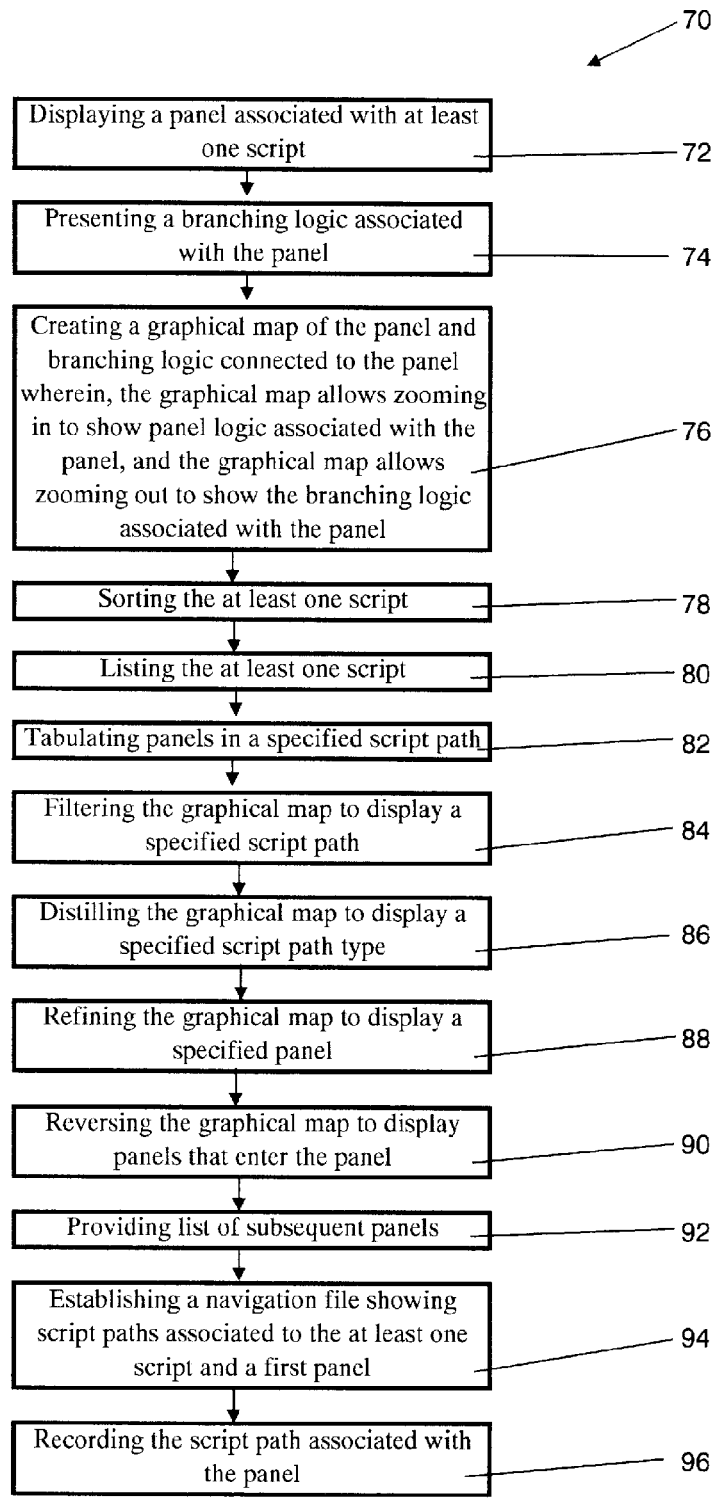
FIG. 5 depicts a second method of script logic graphical mapping in accordance with a preferred embodiment of the present invention.

Referring now to FIG. 5, a second method of script logic graphical mapping 70 is depicted and comprises displaying 72 a panel associated with at least one script, presenting 74 a branching logic associated with the panel and creating 76 a graphical map of the panel and branching logic connected to the panel, wherein the graphical map allows zooming in to show panel logic associated with the panel, and the graphical map allows zooming out to show the branching logic associated with the panel. The method may also comprise sorting 78 the at least one script, listing 80 the at least one script and tabulating 82 panels in a specified script path. The method may additionally comprise filtering 84 the graphical map to display a specified script path, distilling 86 the graphical map to display a specified script path type and refining 88 the graphical map to display a specified panel. The method may further comprise reversing 90 the graphical map to display panels that enter the panel, providing 92 list of subsequent panels, establishing 94 a navigation file showing script paths associated to the at least one script and a first panel and recording 96 the script path associated with the panel. The panels may be displayed as boxes in the graphical map, and the branching logic associated with the panel may be displayed as an arrow. The method is performed by software, hardware, or firmware, and/or the combination of software, hardware, and/or firmware.

Figure 6:
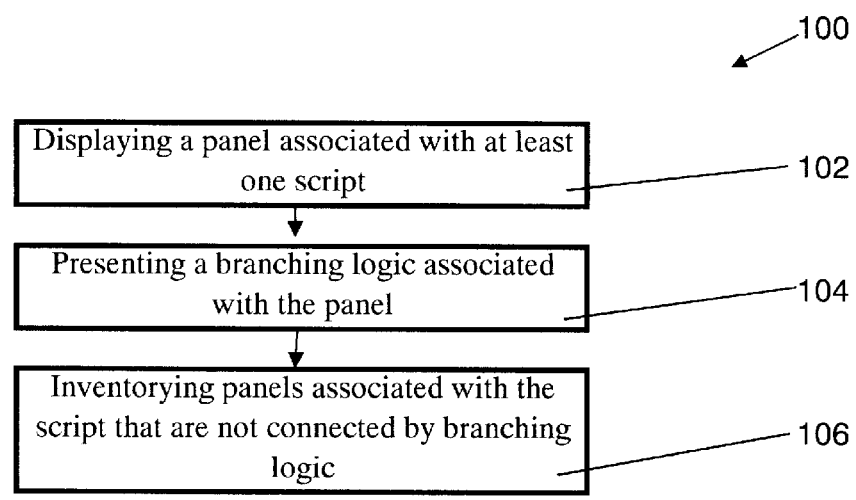
FIG. 6 depicts a first software flow block of script logic graphical mapping in accordance with a preferred embodiment of the present invention.

Referring now to FIG. 6, a first software block diagram of script logic graphical mapping 100 is depicted. The computer readable medium (or software) comprises instructions for displaying 102 a panel associated with at least one script, presenting 104 a branching logic associated with the panel and inventorying 106 panels associated with the script that are not connected by branching logic. These steps are preferably embodied in a computer readable medium or software but may also be embodied in firmware and are utilized via hardware. The transfer of information occurs via at least one of a wireless protocol, a wired protocol and the combination of the wireless protocol and the wired protocol. The steps performed in this figure are performed by software, hardware, or firmware, and/or the combination of software, hardware, and/or firmware.

Figure 7:
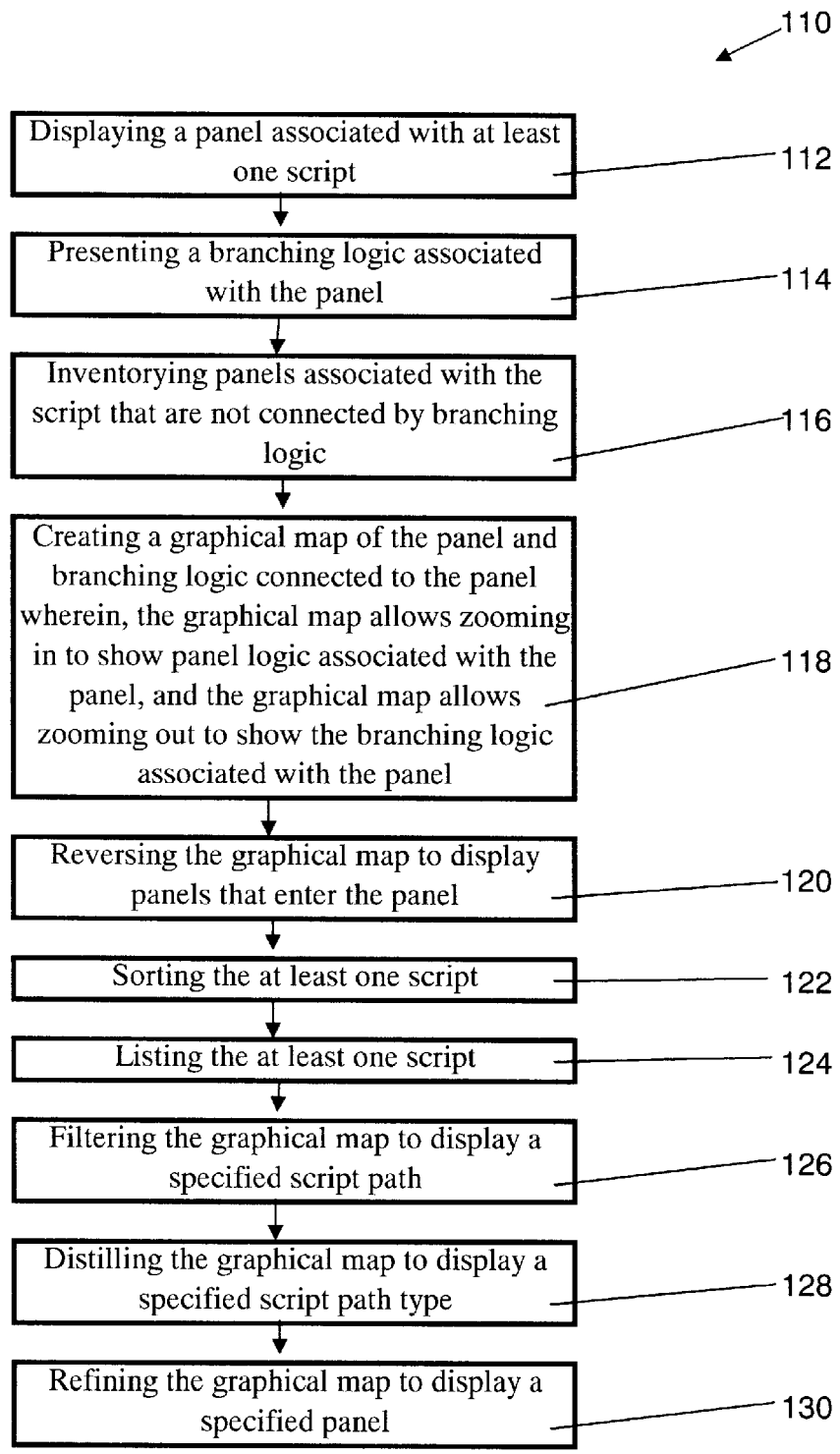
FIG. 7 depicts a second software flow block of script logic graphical mapping in accordance with a preferred embodiment of the present invention.

Referring now to FIG. 7, a second software block diagram of script logic graphical mapping 110 is depicted. The computer readable medium comprises instructions for displaying 112 a panel associated with at least one script, presenting 114 a branching logic associated with the panel and inventorying 116 panels associated with the script that are not connected by branching logic. The computer readable medium may comprise instructions for creating 118 a graphical map of the panel and branching logic connected to the panel wherein, the graphical map allows zooming in to show panel logic associated with the panel, and the graphical map allows zooming out to show the branching logic associated with the panel. The computer readable medium may further comprise instructions for reversing 120 the graphical map to display panels that enter the panel, sorting 122 the at least one script, listing 124 the at least one script, filtering 126 the graphical map to display a specified script path, distilling 128 the graphical map to display a specified script path type and refining 130 the graphical map to display a specified panel. These steps are preferably embodied in a computer readable medium or software but may also be embodied in firmware and are utilized via hardware. The transfer of information occurs via at least one of a wireless protocol, a wired protocol and the combination of the wireless protocol and the wired protocol. The steps performed in this figure are performed by software, hardware, or firmware, and/or the combination of software, hardware, and/or firmware.

Figure 8:
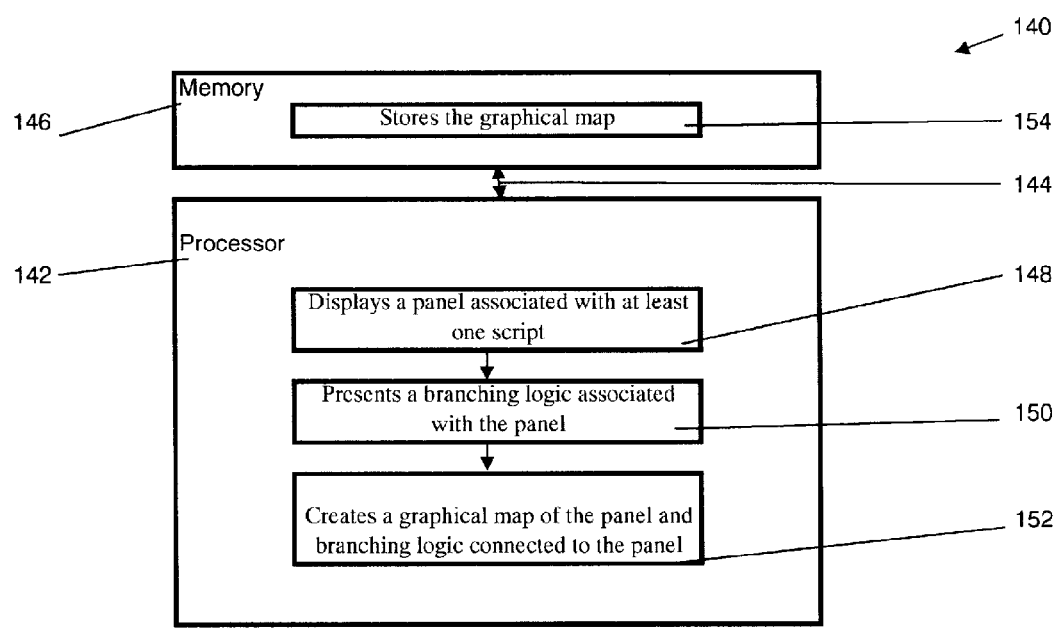
FIG. 8 depicts a first system of script logic graphical mapping in accordance with a preferred embodiment of the present invention.

Referring now to FIG. 8, a first system of script logic graphical mapping 140 is depicted and comprises a processor 142 in communication 144 with a memory 146, wherein the processor displays 148 a panel associated with at least one script, presents 150 a branching logic associated with the panel and creates 152 a graphical map of the panel and branching logic connected to the panel, and wherein the memory stores 154 the graphical map. The transfer of information between the processor and the memory occurs via at least one of a wireless protocol, a wired protocol and a combination of a wireless protocol and a wired protocol. The steps performed in this figure are performed by software, hardware, or firmware, and/or the combination of software, hardware, and/or firmware.

Figure 9:
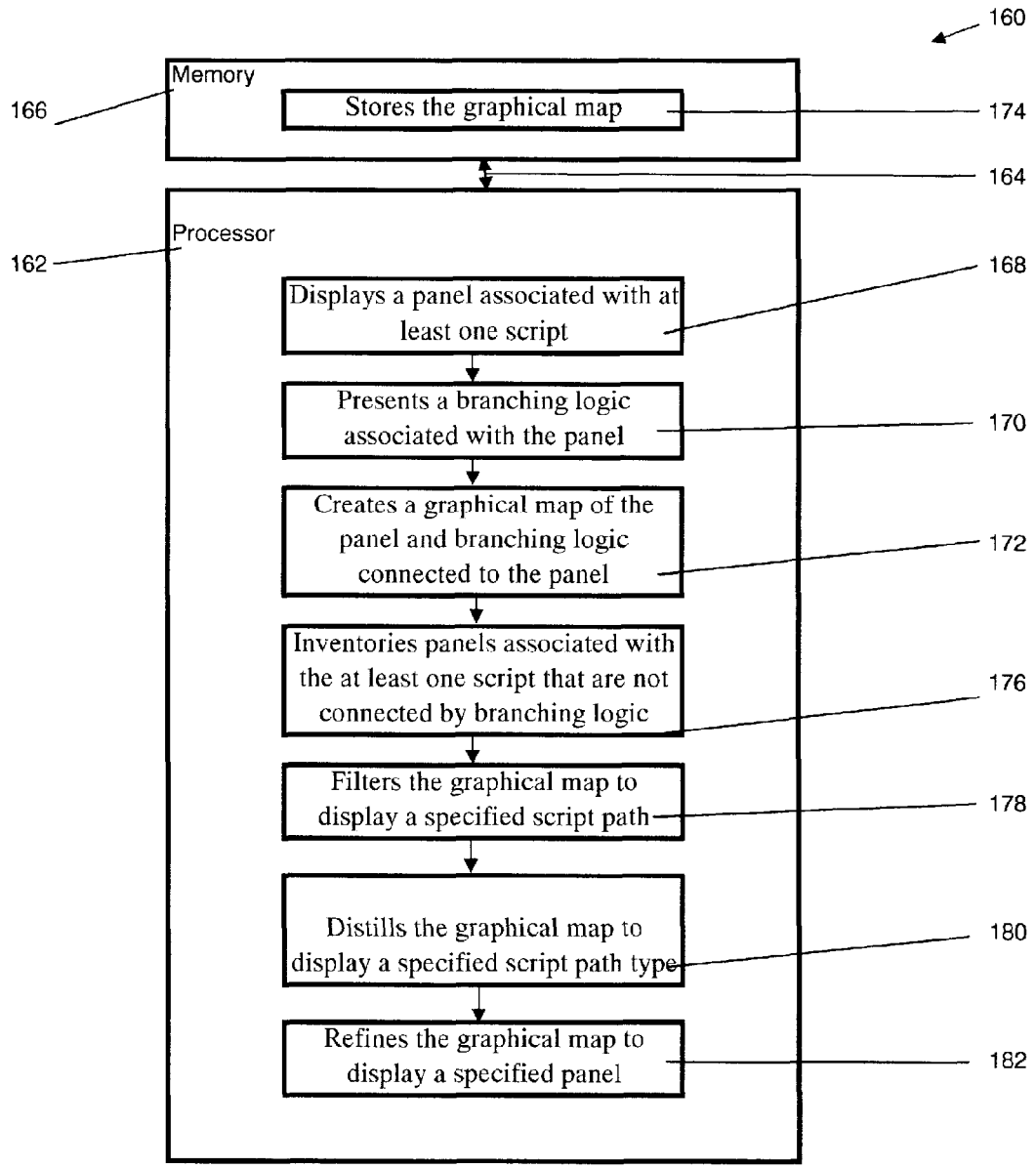
FIG. 9 depicts a system of script logic graphical mapping in accordance with a preferred embodiment of the present invention.

Referring now to FIG. 9, a second system of script logic graphical mapping 160 is depicted and comprises a processor 162 in communication 164 with a memory 166, wherein the processor displays 168 a panel associated with at least one script, presents 170 a branching logic associated with the panel and creates 172 a graphical map of the panel and branching logic connected to the panel, and wherein the memory stores 174 the graphical map. Wherein the system processor may inventory 176 panels associated with the at least one script that are not connected by branching logic, filter 178 the graphical map to display a specified script path, distill 180 the graphical map to display a specified script path type, and refine 182 the graphical map to display a specified panel. The transfer of information between the processor and the memory occurs via at least one of a wireless protocol, a wired protocol and a combination of a wireless protocol and a wired protocol. The steps performed in this figure are performed by software, hardware, or firmware, and/or the combination of software, hardware, and/or firmware.

Although exemplary embodiments of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors or memories. Also, these capabilities may be performed in the current manner or in a distributed manner and on, or via, any device able to provide and/or receive data. Further, although depicted in a particular manner, various modules or blocks may be repositioned without departing from the scope of the current invention. Still further, although depicted in a particular manner, a greater or lesser number of processors, memories and connections can be utilized with the present invention in order to accomplish the present invention, to provide additional known features to the present invention, and/or to make the present invention more efficient.

We claim:

1. A method for script logic graphical mapping, wherein at least one call center agent is presented with graphical panels related to the script logic, wherein the graphical panels provide continuous information to the agent, comprising:

displaying on a first portion of a display at least one panel associated with at least one script, each at least one script comprised of a plurality of panels, each at least one panel comprising instructions, information, and data queries;

presenting a branching logic associated with the at least one panel;

creating a graphical map of the at least one panel and the branching logic, wherein the graphical map automatically zooms in to show panel logic associated with the panel and wherein the graphical map automatically zooms out to show branching logic associated with the panel, wherein the graphical map that is presented to the agent to read, is created by showing all routes out of a script path of the panel or into the script path of the panel where all routes are searched for a target path or a target panel and all routes where the target path or the target panel is located are shortened such that the target path or the target panel is an end point and the graphical map is rendered;

displaying on a second portion of the display the at least one panel's code related to a file describing at least one entry point onto the at least one script, and at least one related first panel of the at least one entry point, wherein the code is read and split into primary sections representing a life cycle of the panel including load, edit, submit and branch, allowing checking for code or display errors;

reversing the graphical map to display panels that enter the panel;

inventorying at least a second panel associated with the at least one script, that is not connected to any current path of the branching logic, the at least second panel listed in a missing panels listbox; and recording the script path associated with the panel.

2. The method of claim 1 comprising:
sorting the at least one script.

3. The method of claim 1 comprising:
listing the at least one script.

4. The method of claim 1 comprising:
tabulating panels in a specified script path.

5. The method of claim 1 comprising:
filtering the graphical map to display a specified script path.

6. The method of claim 1 comprising:
distilling the graphical map to display a specified script path type.

7. The method of claim 1 comprising:
refining the graphical map to display a specified panel.

8. The method of claim 1 comprising:
providing a list of subsequent panels.

9. The method of claim 1 comprising:
establishing a navigation file showing script paths associated to the at least one script and a first panel.

10. The method of claim 1 wherein,
the panels are displayed as boxes in the graphical map; and
the branching logic associated with the panel is displayed as an arrow.

11. A non-transitory computer readable medium for script logic graphical mapping, wherein at least one call center agent is presented with graphical panels related to the script logic, wherein the graphical panels provide continuous information to the agent, comprising instructions for:

displaying on a first portion of a display at least one panel associated with at least one script, each at least one script comprised of a plurality of panels, each at least one panel comprising instructions, information, and data queries;

presenting a branching logic associated with the at least one panel;

creating a graphical map of the at least one panel and the branching logic that is presented to the agent to read, wherein the graphical map automatically zooms in to show panel logic associated with the panel and wherein the graphical map automatically zooms out to show branching logic associated with the panel, wherein the graphical map, is created by showing all routes out of a script path of the panel or into the script path of the panel where all routes are searched for a target path or a target panel and all routes where the target path or the target panel is located are shortened such that the target path or the target panel is an end point and the graphical map is rendered;

displaying on a second portion of the display the at least one panel's code related to a file describing at least one entry point onto the at least one script, and at least one related first panel of the at least one entry point, wherein the code is read and split into primary sections representing a life cycle of the panel including load, edit, submit and branch, allowing checking for code or display errors;

reversing the graphical map to display panels that enter the at least one panel;

inventorying at least a second panel associated with the at least one script that is not connected to any current path of the branching logic, the at least second panel listed in a missing panels list box; and recording the script path associated with the panel.

12. The computer readable medium of claim 11 comprising instructions for:

creating a graphical map of the at least one panel and branching logic connected to the at least one panel wherein, the graphical map allows zooming in to show panel logic associated with the at least one panel, and the graphical map allows zooming out to show the branching logic associated with the at least one panel.

13. The computer readable medium of claim 12 comprising instructions for:

sorting the at least one script; and listing the at least one script.

14. The computer readable medium of claim 12 comprising instructions for:

filtering the graphical map to display a specified script path;

distilling the graphical map to display a specified script path type; and refining the graphical map to display a specified panel.

15. A system for script logic graphical mapping, wherein at least one call center agent is presented with graphical panels related to the script logic, wherein the graphical panels provide continuous information to the agent, comprising:

a processor, wherein the processor displays on a first portion of a display at least one panel associated with at least one script, presents a branching logic associated with the at least one panel, and creates a graphical map of the at least one panel and the branching logic that is presented to the agent to read, wherein the graphical map automatically zooms in to show panel logic associated with the panel and wherein the graphical map automatically zooms out to show branching logic associated with the panel, wherein the first portion of the display shows all routes out of a script path of the panel or into the script path of the panel where all routes are searched for a target path or a target panel and routes where the target path or the target panel is located are shortened such that the target path or the target panel is an end point and the graphical map is rendered, the graphical map enabling an agent or a user to test and troubleshoot a specific path into one of the at least one panel associated with the at least one script;

a second portion of the display wherein the processor displays the at least one panel's code related to a file describing at least one entry point onto the at least one script, and at least one related first panel of the at least one entry point, wherein the code is read and split into primary sections representing a life cycle of the panel including load, edit, submit and branch, allowing for checking code or display errors, wherein the processor inventories at least a second panel associated with the at least one script, that is not connected to any current path of the branching logic, the at least second panel listed in a missing panels listbox, wherein a reverse view function allows a selected panel to be displayed; and a memory communicably coupled to the processor, wherein the memory stores the graphical map and records the script path associated with the panel.

16. The system of claim 15 wherein the processor, inventories panels associated with the at least one script that are not connected by branching logic.

17. The system of claim 15 wherein the processor, filters the graphical map to display a specified script path;

distills the graphical map to display a specified script path type; and refines the graphical map to display a specified panel.

* * * * *